US008370800B2

(12) United States Patent
Burke et al.

(10) Patent No.: US 8,370,800 B2
(45) Date of Patent: Feb. 5, 2013

(54) DETERMINING APPLICATION DISTRIBUTION BASED ON APPLICATION STATE TRACKING INFORMATION

(75) Inventors: Michael R. Burke, Rochester, MN (US); Nicholas F. Campion, Rochester, MN (US); Joseph H. Peterson, Kasson, MN (US)

(73) Assignee: International Business Machines Corporation, Armonk, NY (US)

(*) Notice: Subject to any disclaimer, the term of this patent is extended or adjusted under 35 U.S.C. 154(b) by 976 days.

(21) Appl. No.: 12/132,358

(22) Filed: Jun. 3, 2008

(65) Prior Publication Data

US 2009/0300602 A1  Dec. 3, 2009

(51) Int. Cl.
*G06F 9/44* (2006.01)
(52) U.S. Cl. .................................. 717/115; 717/168
(58) Field of Classification Search .......... 717/120–123, 717/168–178, 115, 117
See application file for complete search history.

(56) References Cited

U.S. PATENT DOCUMENTS

| | | |
|---|---|---|
| 3,626,427 A | 12/1971 | MacSorley et al. |
| 3,963,872 A | 6/1976 | Hagstrom et al. |
| 4,568,018 A | 2/1986 | Husnik |
| 5,166,556 A | 11/1992 | Hsu et al. |
| 5,251,295 A | 10/1993 | Ikenoue et al. |
| 5,338,891 A | 8/1994 | Masubuchi et al. |
| 6,175,869 B1* | 1/2001 | Ahuja et al. .................. 709/226 |
| 6,453,468 B1* | 9/2002 | D'Souza ....................... 717/168 |
| 6,529,784 B1* | 3/2003 | Cantos et al. ..................... 700/79 |
| 6,922,831 B1* | 7/2005 | Kroening et al. .............. 717/172 |
| 7,055,149 B2* | 5/2006 | Birkholz et al. ............... 717/172 |
| 7,086,050 B2* | 8/2006 | Barton et al. ................. 717/173 |
| 7,350,205 B2* | 3/2008 | Ji .................................... 717/172 |
| 7,421,688 B1* | 9/2008 | Righi et al. .................... 717/172 |
| 7,458,073 B1* | 11/2008 | Darling et al. ................ 717/168 |
| 7,478,433 B2* | 1/2009 | Hashiguchi ..................... 726/26 |
| 7,568,018 B1* | 7/2009 | Hove et al. ..................... 709/221 |
| 7,673,301 B1* | 3/2010 | Righi et al. .................... 717/172 |
| 7,703,090 B2* | 4/2010 | Napier et al. .................. 717/168 |
| 7,779,404 B2* | 8/2010 | Movassaghi et al. ......... 717/171 |
| 7,840,960 B2* | 11/2010 | Miura et al. ................... 717/177 |
| 7,966,278 B1* | 6/2011 | Satish ............................. 706/52 |
| 2006/0277102 A1 | 12/2006 | Agliozzo |

* cited by examiner

*Primary Examiner* — Don Wong
*Assistant Examiner* — Mohammad Kabir
(74) *Attorney, Agent, or Firm* — Cantor Colburn LLP (57) ABSTRACT

A method of distributing applications between a plurality of machines forming a client system. The method includes determining that applications should be distributed to maximize hardware utilization of each or the plurality of machines; determining a plurality of possible configurations of applications among the plurality of machines; creating a list of all possible configurations; comparing the list of all possible configurations to a database of state information; removing configurations from the list if the configuration is the same as a state previously determined to be non-functional to create a pruned list; generating a score for each configuration on the pruned list by comparing each configuration with states information in the database; selecting the configurations with the highest score, the number of configurations equaling the number of machines; and deploying the selected configurations on the plurality of machines.

18 Claims, 7 Drawing Sheets

DETERMINING APPLICATION DISTRIBUTION BASED ON APPLICATION STATE TRACKING INFORMATION

CROSS REFERENCE TO RELATED APPLICATIONS

The present application is co-pending with the concurrently filed application U.S. patent application Ser. No. 12/132,038, entitled "CO-RESIDENT SOFTWARE PERFORMANCE TRACKING", filed contemporaneously herewith and hereby incorporated by reference in its entirety, assigned to the assignee of the present application.

BACKGROUND OF THE INVENTION

This invention relates generally to computers and, more particularly, to tracking the effects of different combinations of application programs on a computer.

When attempting to vertically scale a system, understanding the interactions of co-resident applications is vital to understanding their system resource requirements. The traditional methods of determining the ability of applications to co-reside require an integrator providing a computing device such as a mainframe computer, personal computer, handheld computer, and the like, to test all possible combinations of software (also referred to herein as "applications") that may be deployed on the computing device to determine if all combinations allow the computing device to function appropriately. Testing in this manner may be acceptable when there are only a few applications but, as independent software vendor (ISV) and partner applications are added, the domain of end user application combinations grows exponentially. It becomes impractical to test all of the combinations and, even if it was practical to test all combinations of existing applications, it will still remain impractical to constantly test all possible new applications that could be installed on the computing device.

Another method of determining whether co-resident applications will be able to run on a particular computing device is to rely on the system requirements of third parties (ISVs and partners) and use those to estimate workloads on the computing device. This method, however, does not a priori reveal whether two applications designed by different ISVs may have adverse effects on each other. It would be impractical to expect ISV's to test their software with all other ISV's (possibly competitors) for the same reasons as it would be for a system integrator as described above.

Further, relying only on a stand-alone profile of each application, and combining applications based on their profile requirements may fail to reveal negative interaction consequences as well as overstate system requirements. For instance, application A may require 2 GB of memory and application B may require 1 GB of memory, but together they may both be able to operate with 2.5 GB of memory. Combining the requirements would also put integrators at a disadvantage with respect to the ISVs supplying the applications because an integrator may only be as accurate as the ISV's determination of the application's requirements.

There exists a need, therefore, for the ability to measure application co-residency capability without having to test each combination of applications.

In addition, in some cases, it may be desirable to reconfigure existing application configurations for a number or reasons. Again, having the ability to measure co-residency capability and performance without having to test each combination of applications is desirable in such an instance.

BRIEF SUMMARY OF THE INVENTION

One embodiment of the present invention is directed to a method of distributing applications between a plurality of machines forming a client system. The method of this embodiment includes determining that applications should be distributed to optimize hardware utilization of each or the plurality of machines; determining all possible configurations of applications among the plurality of machines; creating a list of all possible configurations; comparing the list of all possible configurations to a database of state information; removing configurations from the list if the configuration is the same as a state previously determined to be non-functional to create a pruned list; generating a score for each configuration on the pruned list by comparing each configuration with states information in the database; selecting the configurations with the highest score, the number of configurations equaling the number of machines; and deploying the selected configurations on the plurality of machines.

Another embodiment of the present invention is directed to a method of distributing applications between a plurality of machines forming a client system. The method of this embodiment includes determining that applications should be distributed to consolidate free space in the client system on a first machine; removing the first machine from a list of available machines; determining all or at least a plurality of possible configurations of applications among the plurality of machines on the list of machines; creating a list of all possible configurations; comparing the list of all possible configurations to a database of state information; removing configurations from the list if the configuration is the same as a state previously determined to be non-functional to create a pruned list; generating a score for each configuration on the pruned list by comparing each configuration with states information in the database; and selecting the configurations with the highest score, the number of configurations equaling the number of machines; determining that one of the selected configurations requires more hardware than provided by any of the available machines; placing an application in the one of the selected configuration having the smallest load on an auxiliary list; and deploying the application on the first machine.

Another embodiment of the present invention is directed to a method of balancing load between a plurality of machines in a client system. The method of this embodiment includes determining that applications should be distributed to maximize hardware utilization of each or the plurality of machines; determining all possible configurations of applications among the plurality of machines; creating a list of all possible configurations; comparing the list of all possible configurations to a database of state information; removing configurations from the list if the configuration is the same as a state previously determined to be non-functional to create a pruned list; generating a score for each configuration on the pruned list by comparing each configuration with states information in the database; selecting the configurations with the highest score, the number of configurations equaling the number of machines; and deploying the selected configurations on the plurality of machines.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides the ability to determine whether a particular application may be safely added to client computing device. Advantageously, information about which co-resident applications may safely run on a computing system may be determined without requiring that a system integrator test every possible combination of applications.

In more detail, an embodiment of the present invention tracks client deployments of applications and uses aggregated information about the deployments to determine how co-resident applications affect each other's performance. Instead of the traditional profiling focused on each application standing alone, embodiments of the present invention focus on what happens when adding the application to an environment running some group of existing applications. This performance and resource usage may be tracked on client deployments and used to dynamically adjust an application's system requirements in an e-market place. In short, rather than testing all possible application combinations, clients are allowed to install any configuration unless another client has installed the configuration and it has been determined to be a non-functional configuration. In this manner, a collection of client, rather than the integrator, will perform the configuration tests.

In one embodiment, the present invention includes two modules, one that is resident in either hardware or software at a client's computing system (referred to as the "client" or "client system") and one that is resident in either hardware or software at a server (referred to as the "server"). The client module tracks system performance in intervals called "states." Each state is associated with a set of applications installed on the client. The state measures a duration of time over which the set of applications on the system did not change. A state could also contain the systems hardware configuration (in certain circumstances) and what the previous state was. Any time a new piece of software is added to the machine, the client module creates a new state and that state's time starts. In terms of analysis, the performance of a state will describe the observed average performance of a set of applications that are co-resident on a single client machine for some duration. Periodically, and at the end of each state's duration, the current state's performance information will be uploaded to a database. An upload can also be triggered remotely by service on demand.

The server module has two main roles: managing the distribution of software and correlating the performance information gathered from multiple clients. The server on which the server module is resident, hosts a location where users of the client may go to download new applications for their systems. The server aggregates the state information from the clients to determine if there are any states where the application will not function. When a particular client, or user of that client, attempts to purchase and/or install a new application, the client's current state is compared with the aggregated state information stored on the server to determine if their proposed new application state will function. In this way, safe guards against unsafe application deployments may be enhanced.

In other embodiments, the information about state performance may be used, as described below, to distribute applications among multiple machines forming a client system.

Figure 1:
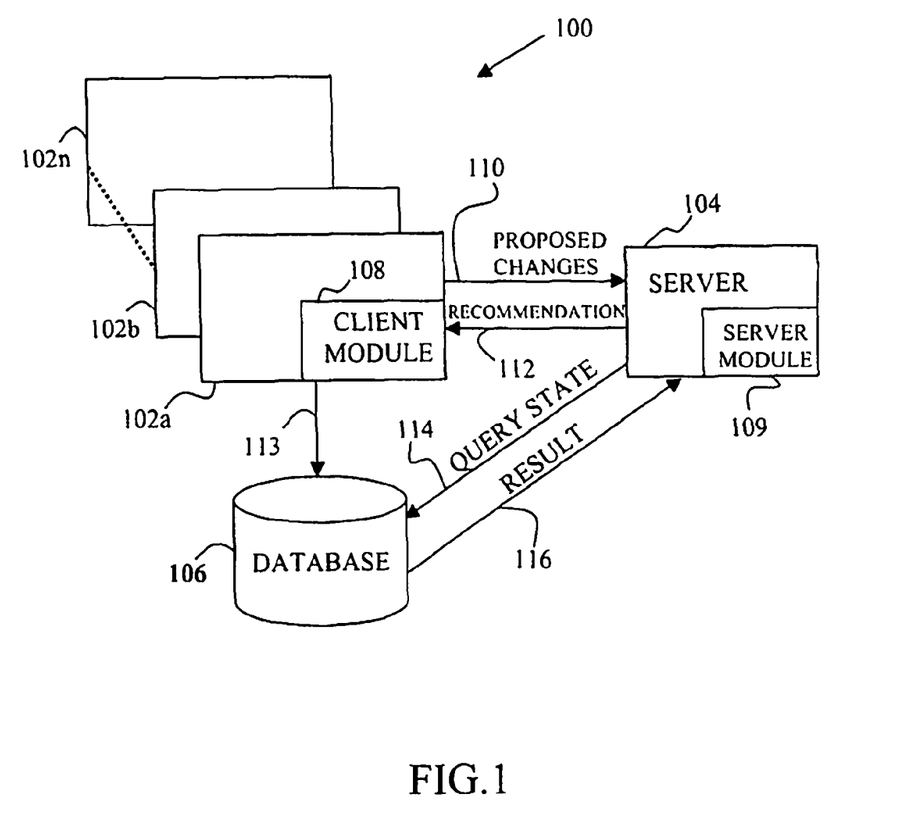
FIG. 1 depicts an example of a system according to an embodiment of the present invention.

FIG. 1 shows an example of a system 100 according to one embodiment of the present invention. The system includes a plurality of clients 102a, 102b . . . 102n, a server 104 and a database 106. As shown, the database 106 is a separate unit. In some embodiments, the database 106 may be part of the server 104. As shown, the clients 102, the server 104 and the database 106 are connected to one other via various communication lines (e.g., communication lines 110, 112, 113, 114, and 116). In some embodiments, the communication lines may be part of a communications network such as the Internet.

The client 102 may be implemented using a general-purpose computer executing a computer program for carrying out various processes. The client 102 may be a personal computer (e.g., a lap top, a personal digital assistant) or a host-attached terminal. If the client system 102 is a personal computer, the processing described herein may be shared by the client system 102 and the server 104 (e.g., by providing an applet to the client system 102). Alternatively, the client 102 may be a remote system operating over a wireless network.

The server 104 executes computer instructions for determining the risks associated with allowing a client to move from one state to another. In an exemplary embodiment, the server 104 includes a server module that accesses the database 106 and determines the risks associated with a particular state change request received from a client 102.

The communication links 110, 112, 113, 114, and 116 may be part of any type of known networks including, but not limited to, a wide area network (WAN), a local area network (LAN), a global network (e.g. Internet), a virtual private network (VPN), and an intranet. The networks may be implemented using a wireless network or any kind of physical network implementation known in the art. A client 102 may be coupled to the server 104 and the database 106 through multiple networks (e.g., intranet and Internet) so that not all client systems 102 are coupled to the server 104 through the same network. In one embodiment, clients 102 may be connected directly to the server 104 (i.e., not through a network) and the server 104 may be connected directly to or contain the database 106.

The database 106 includes data repositories with databases relating to state information and may be implemented using a variety of devices for storing electronic information. It is understood that the database 106 may be implemented using memory contained in one or more servers (e.g., server 104) or that it may be comprised of separate physical devices. Information stored in the database 106 may be retrieved and manipulated via the server 104 and/or via the client 102. The database 106 may include one or more databases containing state information. The state information in the databases may be text or binary coming from a variety of sources, such as, but not limited to, applications running on clients 102.

As discussed above, one or more of the clients 102 may include a client module 108. The client module 108 tracks system performance in intervals called "states." Each state is associated with a set of applications installed on the client. The state measures a duration of time over which the set of applications on the client 102 did not change. A state could also contain the systems hardware configuration (in certain circumstances) and what the previous state was. Any time a new piece of software (application) is added to the machine, the client module 108 creates a new state and that state's time starts. In terms of analysis, the performance of a state will describe the observed average performance of a set of applications that are co-resident on a single client machine for some duration. Periodically, and at the end of each state's duration, the current state's performance information will be uploaded to a database. An upload can also be triggered remotely by service on demand.

The server 104 may include a server module 109. The server module 109 may have two main roles: managing the distribution of software and correlating the performance information gathered from multiple clients. The server 104 on which the server module 109 is resident, may host a location (such as a web-site) where users of the client 102 may go to download new applications. When the client, or user of that client, 102 attempts to purchase and/or install a new application, the client's current state is compared, by the server 104, with the aggregated state information stored in the database 106 to determine if the proposed new application state will function. In this way, safe guards against unsafe application deployments may be enhanced. In one embodiment, the server 104 may limit the ability of a client 102 to move to a state that has previously been determined to be unsafe, the server 104 may simply deny to software installation. In other embodiments, the server 104 may allow the installation but may warn a user of the client 102 that installing the software may adversely effect the operation of the client 102. For instance, the server may inform the client 102 that a particular installation may move the client 102 into a "marginal" or "degraded" state. Other states that may be utilized in embodiments of the present invention may include "healthy" and "non-functional." A non-functional state may not be allowed and a healthy state may be allowed without any user of a particular client 102 input. Marginal and degraded states may require that the user of client 102 make a decision as to whether to install the particular application after receiving a notification that the proposed state may be place the client 102 in either of these states.

It may be noted that the present invention may be especially useful when hardware capabilities are constant across clients 102. For instance, if all clients 102 have the same hardware capabilities but could potentially have different applications installed. Thus, rather than having to give specific hardware resource requirements for each piece of software, the server 106 may simply examine all the combinations of applications and determine which sets are capable of running simultaneously on the same client. As different hardware versions become available, different domains of application states will need to be tracked. This is significant because application state A on client version A would not necessarily run the same as state A on version B (with different hardware).

The implementation of "state tracking" by the server module 109 may involve querying a table database 106 that contains all the known application states (a software state that has been used) for a single model of a client. To determine these states, all pieces of software packages being installed on the system would need to have a unique ID assigned (Product Package ID). Whenever a new application state is created by a client 102 using a set of applications that has not been previously used, a new entry is added to the table. As applications are installed, the performance information for the client's previous state is uploaded to the server 104 and is entered into the table in the database 106. That information can now be referenced by other clients as they make a decision on whether to purchase an application.

FIG. 1 will now be described as a dataflow diagram. That is, the following description follows data transfer between the client 102, the server 104 and the database 106 in normal operation. The following description references communication links 110, 112, 113, 114 and 116. The references to these links describes the data flow and could, of course, be implemented as any type of communication connection so long as the described data is capable of being sent from the first location to the second location.

Periodically, the client module 108 may send a status update along communication path 113 to the database 106. The status update may include, for example, an identifier for the client 102 on which the module is resident, the applications running on the client 102, the hardware configuration of the client 102 and an operational status identifier indicating how well the client 102 is performing. The information from the status update may be stored in the database 106. In addition, each time a client 102 adds a new application or removes an application, the client 102 transmits a change of state message to the database. The change of state message may be the same as a typical status update only that the application list is changed. As discussed above, when an application list containing a combination of applications not previously recorded is presented, a new state is created.

The addition of an application to a client 102 may occur in a number of ways. According to an embodiment of the present invention, a client or user of client 102 may choose one or more applications to install from a group of applications. The group of applications may be represented on the server 104. In one embodiment, the server 104 may contain a listing of available applications and have links to another location where the application is stored for download. In another embodiment, download copies of the applications may be stored on the server 104.

Regardless, the client 102 submits a proposed change message to the server 104 via communication link 110. The proposed change message may, in some embodiments, only include a client ID and an application requested or it may contain a current state and a proposed new state. Regardless, the server module 109 contained in the server 106 queries the database 106 as indicated by communication link 114. The results of the query may be transmitted back to the server module 109 as indicated by communication link 116. Based on the results, the server module 109 may block the download of particular application, may alert a user of the client 102 that downloading the software may adversely affect the client 102, or may either indicate that the download is acceptable or just allow the download to happen.

Figure 2:
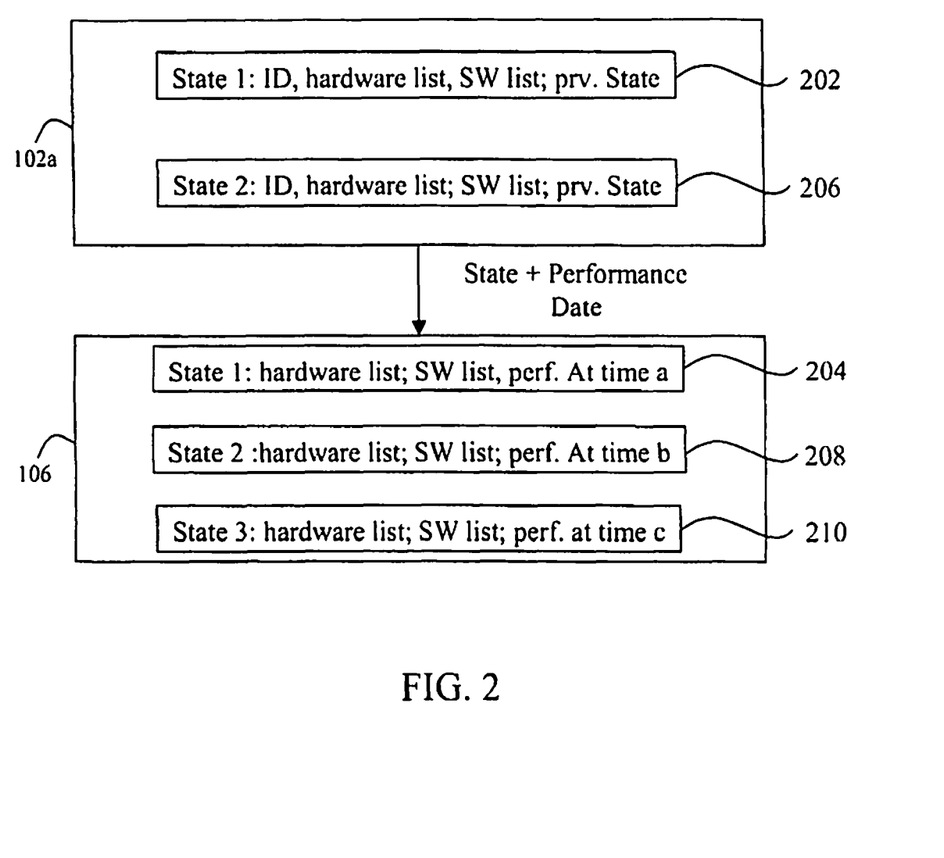
FIG. 2 depicts a more detailed example of a portion of the system depicted in FIG. 1.

FIG. 2 shows various states over time in a first client 102a and an example of how those states are represented by in the database 106. At a first time (a), the client 102 may be in a first client state 202. This state may be characterized by one or more of the following attributes: a client identification (ID), a hardware list, an application or software list, a previous state and a performance indicator. The hardware list may identify some or all of the hardware comprising the client 102a, or it may simply contain a hardware version identifier. As discussed above, in some systems the hardware configuration may be the same for all clients 102. In such a case, the hardware list may not be needed. The application list may contain a listing of all software programs resident on the client. This list may include not only the software programs but also may include all of the add-ons or other software programs dedicated to assisting the operation of other programs. The previous state may be an indication of the state the machine was in before the current state. In this example, the previous state of first client state 202 may be state 0. The performance indicator may, for example, a representation of the number of errors occurring in the system, system speed, and the like.

In the database 106, the first client state 202 may be represented by the first state 204. This first state 204 may include a hardware list, a software list and a performance indicator at a particular time. In this example, the particular time is a first time (a). The "time a" designation may represent a time at which a client changed states or when a client sent a status update.

At a second time (b), the client 102a may be in a second state 206. This second state may by characterized by the same fields as the first state 202 but have a different application state and the previous state for the second state 206 is the first state 202. In some embodiments, the previous state may be represented by an indication of applications added (or deleted) that caused the client 102a to change states.

The database 106 may include two more records, 208 and 210 for the second state. The first record of the second state 208 may indicate a time b when that particular was entered and a second record of the second state 210 recorded at a later time, time c. Having multiple records of the same state may allow for performance tracking.

It will be understood that many clients 102 may be coupled to the database 106. Each time a new application list is received from any of these clients, a new state may be created and the continued viability of operation in that state tracked.

Figure 3:
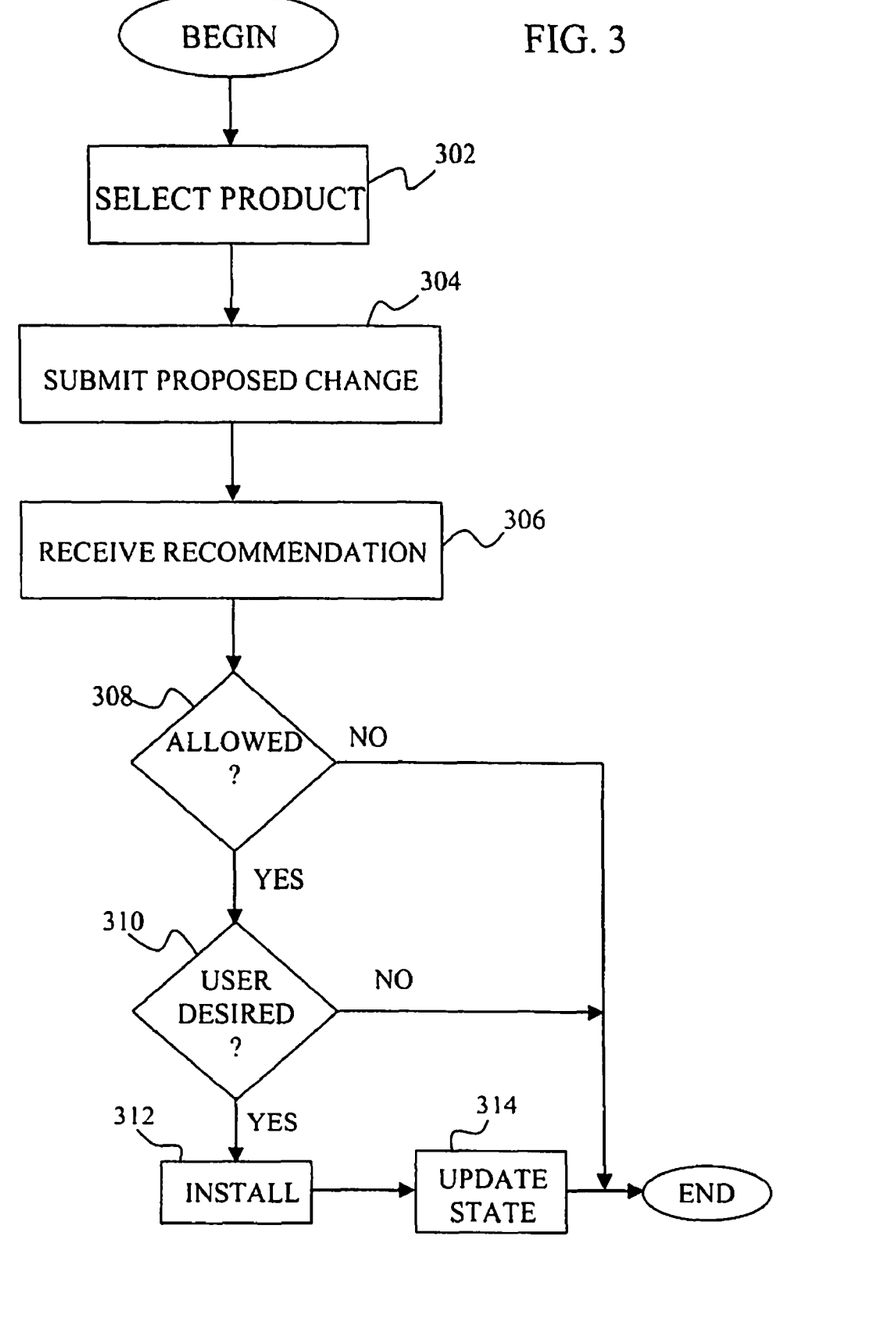
FIG. 3 shows a block diagram of a process by which a database of acceptable combinations of application software may be created and installation of new applications may be monitored according to an embodiment of the present invention.

FIG. 3 shows an example of a process according to one embodiment of the present invention. At a block 302, a product may be selected for addition to a particular client. The selection of a product may entail a user causing the client to go to a particular website maintained by a server. In some embodiments, this server may be the server 104 described with respect to FIG. 1. However in some embodiments the product or application may be available from other locations. Regardless, at a block 304 a proposed state change is submitted to a central server. The proposed state change may include an indication of the current state of the machine. In some embodiments this current state may be represented by the application list described above. The proposed change will also include an indication of the application that the client wishes to add.

At a step 306 the client or user of client may receive a recommendation as to the risk associated with adding the desired application. How such a recommendation is created will be discussed in greater detail below. At a block 308 it is determined whether the proposed change is allowed. If it is not, the application is not downloaded nor installed. If the program is allowed, processing proceeds to a block 310 where a user is prompted to determine whether or not they want to download and install the application. As discussed above a recommendation may include notification that, while the application may be installed, the installation of the program may degrade performance of the client. Hence, the choice provided in block 310 allows the user to determine whether the possible consequences outweigh the rewards of installing the application. If the user so desires, processing proceeds to a block 312 where the program is downloaded and installed. After the program has been downloaded and installed at a block 314 the state of the client is updated as describe above.

Figure 4:
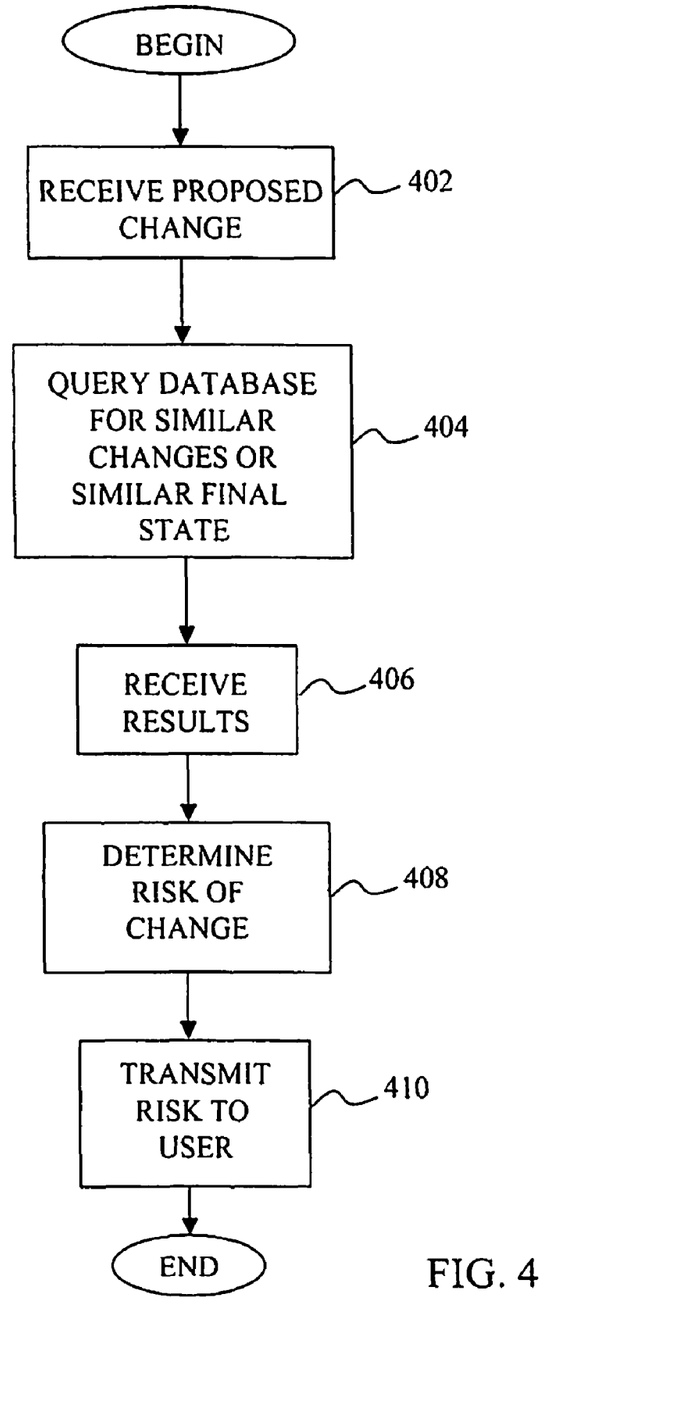
FIG. 4 shows a block diagram of a process by which a server may determine the risk associated with a proposed installation of an application by a client in one embodiment of the present invention.

FIG. 4 shows an example of a method performed at a server 104 according an embodiment of the present invention. In some embodiments process shown in FIG. 4 may be performed in the server module 109. At block 402 a proposed changes are received from a client. At block 404 the database is queried to see if similar changes have been requested or a final state similar to the one requested by the client has already been created. If no similar state exists, a new state is created. This new state may not have any performance information associated with it.

At block 406 results are received from the database. At block 408 the risk of the proposed new state or risk of change is determined. At block 410 the risk is transmitted back to the client. Of course no risk may be transmitted if the proposed state is disallowed.

Figure 5:
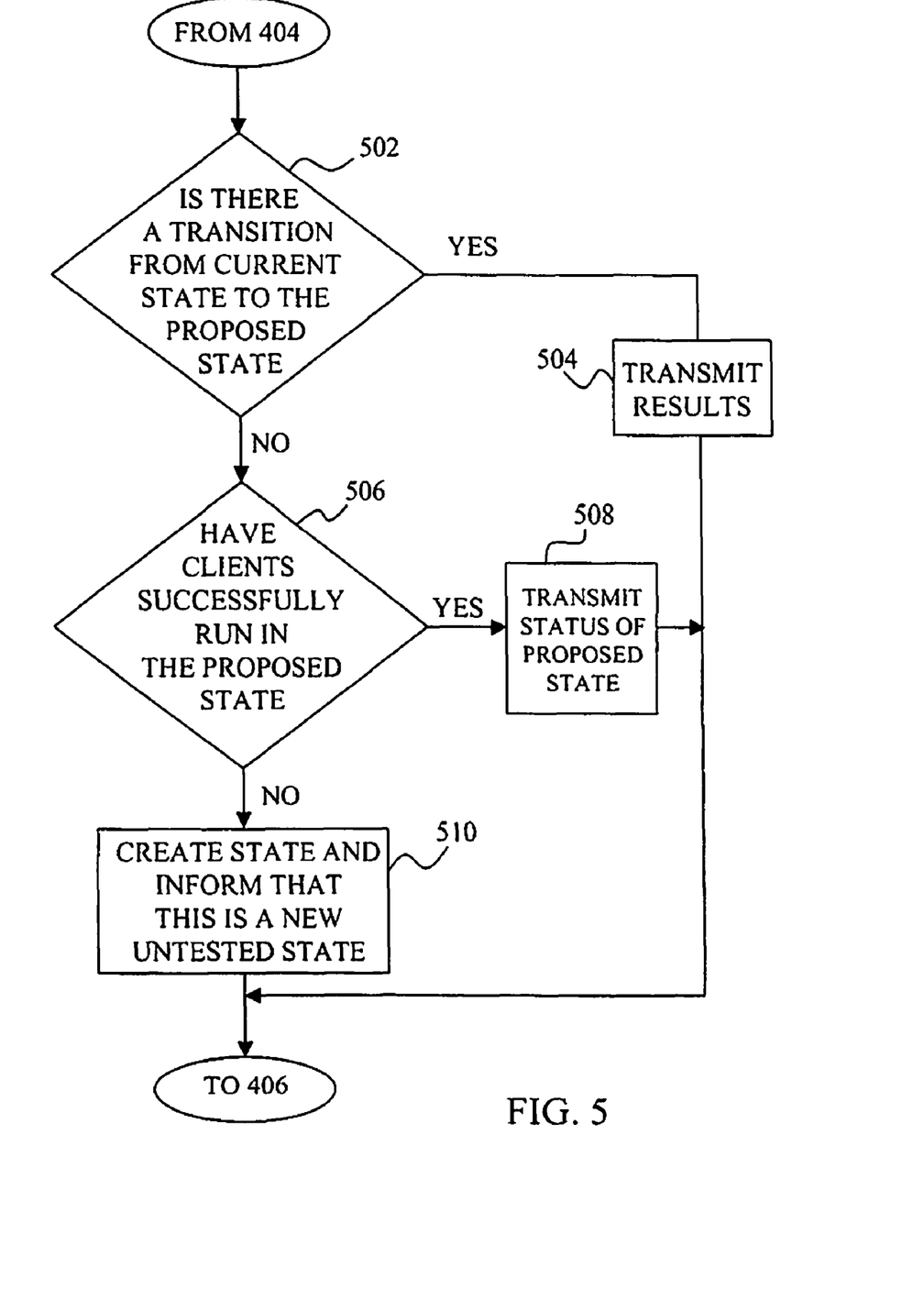
FIG. 5 shows a more detailed block diagram of a process that may be performed in one of the blocks shown in FIG. 4.

FIG. 5 shows a more detailed example of the process performed in block 404 shown in FIG. 4. The process begins at block 502 where the database is queried to determine whether there is a transition from the current state of the proposing client to the final state proposed by the client. If such a state transition exists, the results of such a change are transmitted to the server in block 504. Another embodiment might return results if a threshold number of state transitions exist. These results could include, for example, an indication that the state change caused degraded performance. If, however, such a state transition has not occurred, the database may be examined to see if a state matching the proposed state exists at block 506. Is such a state exists, the performance (also referred to as a status) is transmitted to the server 508. If such a state does not exist, the state is created and the server is informed that the state is a new state 510. Another embodiment might return results based on the existence of a threshold number of states.

The above description details how a database of possible state configurations and their respective performance may be created. As detailed above, this database may be utilized to determine if a proposed software state is safe as well as the performance of particular software states.

The information may, however, have additional uses. For instance, Computer resources often need to be adapted to constantly changing business needs and environments. An example where this problem would arise would be when a customer has two similar, midrange computers and decides that he or she would like to add a third. The expectation is that the customer can redistribute his or her applications to the additional machine to reduce stress on the initial machines by improving resource (cpu, memory, disk arms, etc.) availability.

One embodiment of the present invention solves these problems by utilizing the database to determine the best way to redistribute applications that previously ran on a set of one or more computers to a new set of more than one computers. Similar to the problems described in the background section above, utilizing trial and error the customer can run the systems with different applications running on the different systems until they find one that works. The major drawbacks to this approach are the amount of time it might take to move these applications around and that the administrator will not know whether or not they have ever reached the "optimal" configuration. These problems are made more significant if the systems are production systems in which downtime means lost business. The second option is to base the new deployment on each application's stand-alone requirement analysis. There are two major drawbacks to this option. First, the customer must assume that the stated requirements of the product are accurate, which is often not the case. The second drawback is that, even if the stated application requirements are true, when the application is put on a machine with another application there may be unforeseeable interactions that cause one or both applications to have lower performance.

Thus, there exists a need to identify and assess the optimal deployment of applications on multiple existing server machines or partitions, to redeploy those applications into a more optimal permutation on this set of servers/partitions for existing customer deployments, and to update sizing data used by the order-time process to provide more accurate and optimal order-time selections for new customers.

Figure 6:
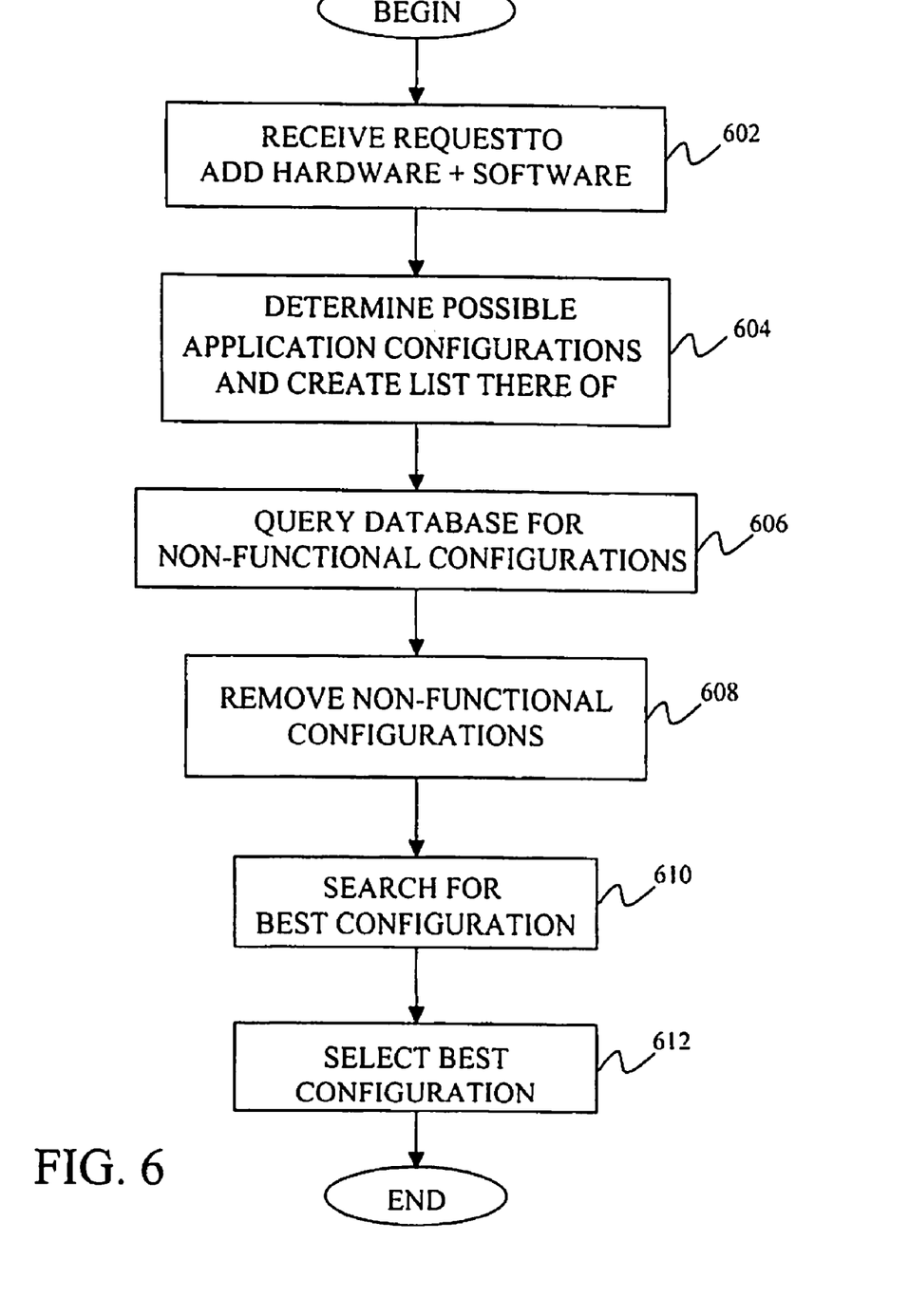
FIG. 6 depicts one embodiment of a method by which applications may be redeployed upon the client adding additional hardware.

FIG. 6 depicts one embodiment of a method by which applications may be redeployed when a client adds additional hardware. It will be understood that the client may also desire new software with the new hardware.

At block 602 a request to add additional hardware and possibly software is received from a client. The request could be received in any manner. For instance, the client could order the hardware (typically a new client-side server or computer) from the organization maintaining the server either electronically or by other means.

At block 604 a list of all or at least a plurality of possible application configurations for the hardware is generated. There may be some configurations which are not completely configured based on predetermined information including, for example, known combinations which do not perform well. The generation of such a list may include a number of combinations equal to the number applications time the number of client machines that may exist for use. In one embodiment, the number of machines may include all machines available to the client, that is, the number of machines the client will own after adding the new hardware. In such a case, the present invention attempts to maximize or optimize hardware usage across all machines. In another case, the client may wish to consolidate free resources in a one location. Such an embodiment is considered below. In some embodiments, the configurations may also be limited by size constraints of the machines forming the client system. For instance, a particular combination may require more memory than is available on a single machine. In such an instance, the combination may not be included in the list. In another embodiment, the combination may be included in the list but be determined to be non-functional either at block 604 or another block (for instance, block 606).

Regardless, at block 606, the list generated by block 604 is compared to the database to determine if any of the configurations are nonfunctional. That is, if a configuration is the same as a state that has previously been determined to be non-functional, the configuration is determined to be non-functional.

At block 608, non-functional configurations are removed from the list of possible configurations. The end result is a pruned list having only functional states.

At block 610, the best configuration is searched for. This may be accomplished by, for example, comparing each configuration to the states in the database and recording the performance for each of the configurations based on the performance of the state it matches. In more detail, each configuration is compared to the states in the database and its total free resources are evaluated. During this evaluation, a heuristic may be used to determine a value that describes the sum of the free resources across the machines. This heuristic could give high priority to the central processing unit (CPU) and random access memory (RAM) and low priority to disk space or vice versa. Furthermore, the heuristic may track the states described above and give a higher score to "functional" states than to "degraded" states, for example.

At block 612, the best configuration is selected. In one embodiment, the combination with the highest score as determined above is selected for deployment.

It will be understood, that the above method may also be used in situations where no additional machines or hardware are to be added to the system. For instance, a user of a user system may desire to redistribute existing applications among machines included the user system. One possible reason for such a desire may be to simply increase the performance of an existing client system.

Figure 7:
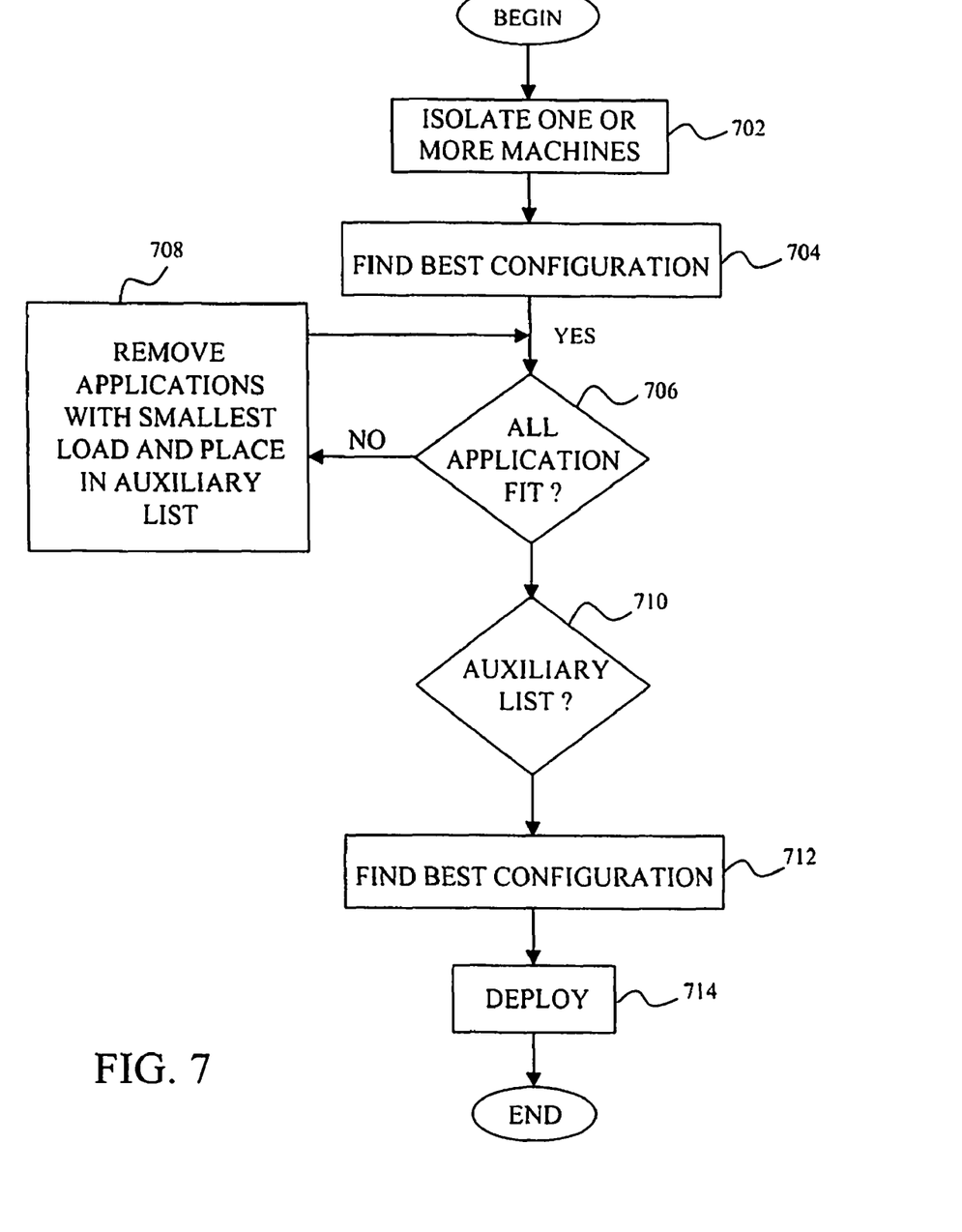
FIG. 7 shows a method by which an application deployment that consolidates free space onto a single machine may be created.

FIG. 7 shows a method by which an application deployment that consolidates free space onto a single machine may be created. At block 702 one or more of the machines are isolated from the list of available machines. That is, the new machine may be removed from the list of possible machines. As such, the number of combinations will decrease because there are fewer machines to locate the applications on.

At block 704 the best configurations are determined as described in FIG. 6. At block 706 best configurations are compared to the hardware allotments to determine if all applications will fit on the allotted hardware. If not, at block 708, the application having the smallest load is removed from the configuration and placed an auxiliary list. This process may be repeated until all of the applications for each configuration may fit on the allotted hardware.

At block 710, it is determined whether an auxiliary list has been created. If not, the applications are deployed at block 714. In the event an auxiliary list exists, at block 712 the best configuration for the applications on the auxiliary list is determined utilizing the isolated machines and then deployed at block 714.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of distributing applications between a plurality of machines forming a client system, the method comprising:
    determining that applications should be distributed to optimize hardware utilization of each or the plurality of machines;
    determining all possible configurations of applications among the plurality of machines;
    creating a list of all possible configurations;
    comparing the list of all possible configurations to a database of state information;
    removing configurations from the list if the configuration is the same as a state previously determined to be non-functional to create a pruned list;
    generating a score for each configuration on the pruned list by comparing each configuration with states information in the database;
    selecting the configurations with the highest score, the number of configurations equaling the number of machines; and
    deploying the selected configurations on the plurality of machines.

2. The method of claim 1, wherein determining includes receiving a request to add an additional machine to the client system.

3. The method of claim 2, wherein the request includes a request to add additional applications.

4. The method of claim 3, determining all possible configurations includes determining combinations that include the additional applications.

5. The method of claim 1, wherein creating includes placing all configurations on the list.

6. The method of claim 1, wherein creating includes placing only configurations that utilize less memory than the machine includes.

7. The method of claim 1, wherein removing includes removing configurations that utilize more memory than the machine includes.

8. The method of claim 1, wherein generating includes assigning a higher score to combinations that match functional states than match degraded states.

9. A method of distributing applications between a plurality of machines forming a client system, the method comprising:
    determining that applications should be distributed to consolidate free space in the client system on a first machine;
    removing the first machine from a list of available machines;
    determining all possible configurations of applications among the plurality of machines on the list of machines;
    creating a list of all possible configurations;
    comparing the list of all possible configurations to a database of state information;
    removing configurations from the list if the configuration is the same as a state previously determined to be non-functional to create a pruned list;
    generating a score for each configuration on the pruned list by comparing each configuration with states information in the database;
    selecting the configurations with the highest score, the number of configurations equaling the number of machines;
    determining that one of the selected configurations requires more hardware than provided by any of the available machines;
    placing an application in one of the selected configurations having the smallest load on an auxiliary list; and
    deploying the application on the first machine.

10. The method of claim 9, wherein determining includes receiving a request to add an additional machine to the client system.

11. The method of claim 10, wherein the request includes a request to add additional applications.

12. The method of claim 11, determining all possible configurations includes determining combinations that include the additional applications.

13. The method of claim 9, wherein creating includes placing all configurations on the list.

14. The method of claim 9, further comprising:
    deploying the one selected configuration on another machine.

15. The method of claim 9, wherein generating includes assigning a higher score to combinations that match functional states than match degraded states.

16. A method of balancing load between a plurality of machines in a client system, the method comprising:
    determining that applications should be distributed to maximize hardware utilization of each or the plurality of machines;
    determining all possible configurations of applications among the plurality of machines;
    creating a list of all possible configurations;
    comparing the list of all possible configurations to a database of state information;
    removing configurations from the list if the configuration is the same as a state previously determined to be non-functional to create a pruned list;
    generating a score for each configuration on the pruned list by comparing each configuration with states information in the database;
    selecting the configurations with the highest score, the number of configurations equaling the number of machines; and
    deploying the selected configurations on the plurality of machines.

17. The method of claim 16, wherein creating includes placing all configurations on the list.

18. The method of claim 16, wherein generating includes assigning a higher score to combinations that match functional states than match degraded states.

* * * * *